March 10, 1942.    R. B. COTTRELL    2,276,228
SNUBBER
Filed Feb. 17, 1940    2 Sheets-Sheet 1
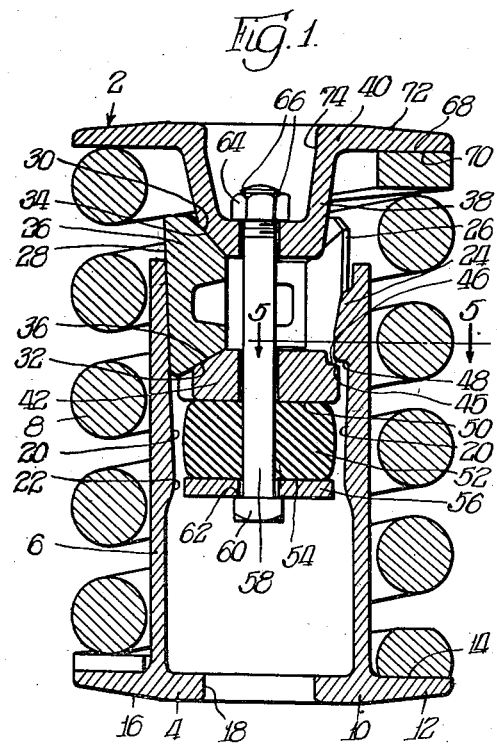
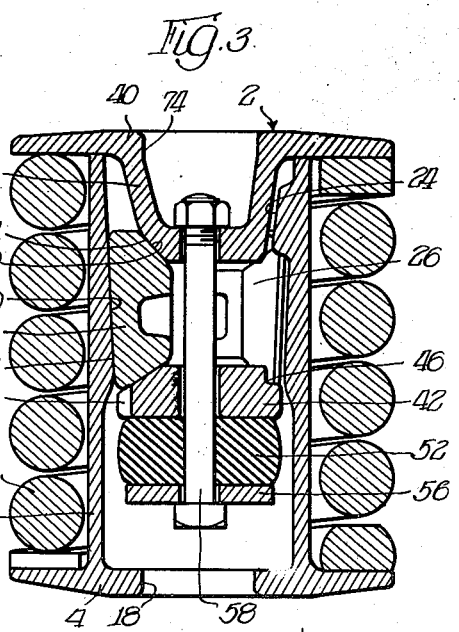
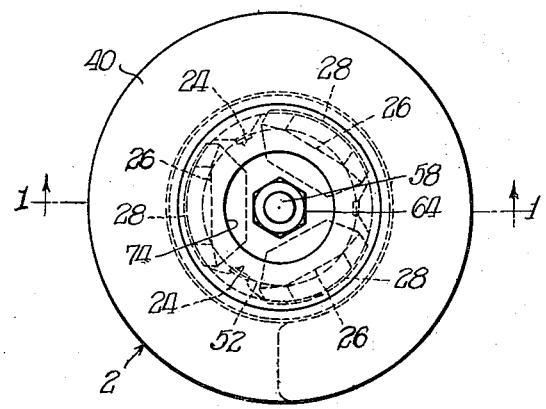
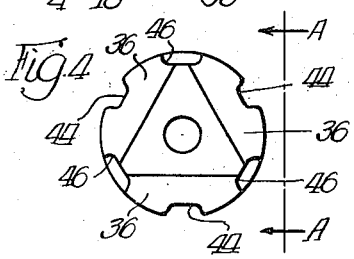
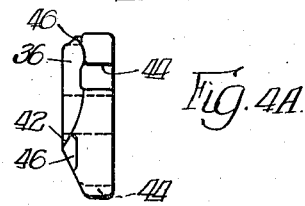
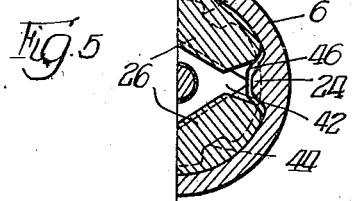
INVENTOR.
Robert B. Cottrell,
BY
ATTORNEY.

March 10, 1942. R. B. COTTRELL 2,276,228
SNUBBER
Filed Feb. 17, 1940 2 Sheets-Sheet 2
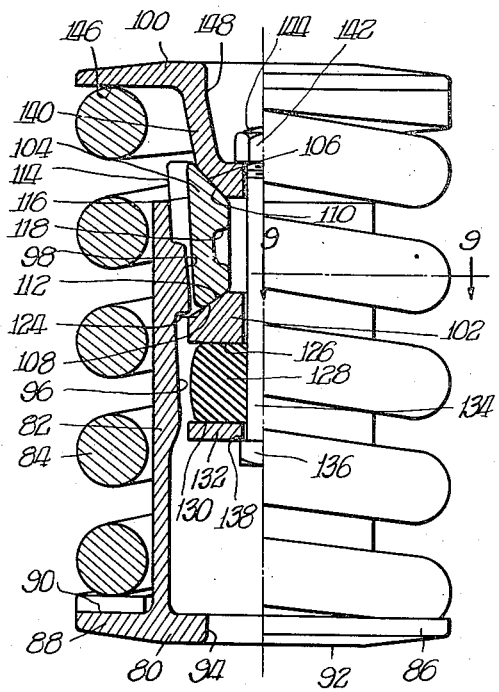
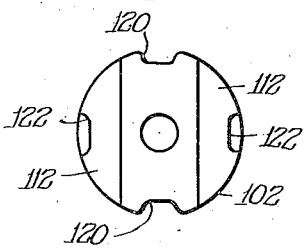
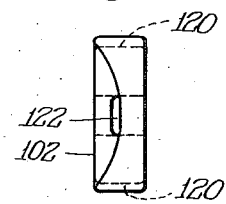
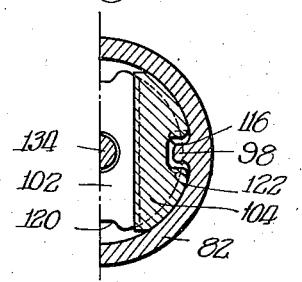
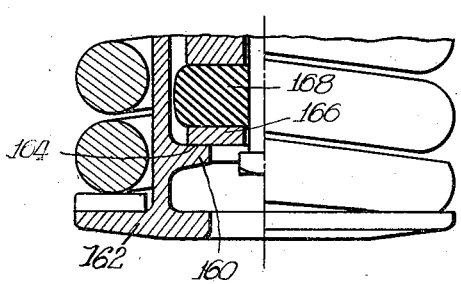
INVENTOR.
Robert B. Cottrell,
BY
ATTORNEY.

Patented Mar. 10, 1942

2,276,228

UNITED STATES PATENT OFFICE 2,276,228

SNUBBER

Robert B. Cottrell, Chicago, Ill., assignor to American Steel Foundries, Chicago, Ill., a corporation of New Jersey Application February 17, 1940, Serial No. 319,401

18 Claims. (Cl. 267—9)

My invention relates to friction absorbing devices and more particularly to a device having friction means operable within a coil spring and which may be adapted to railway car trucks in general use.

An object of my invention is to devise a friction absorbing device of novel form particularly adapted for use in railway cars.

My invention comprehends a frictional absorbing device suitable for replacement of a single supporting coil and comprises a bottom follower having a cylindrical friction barrel and a top follower clutch assembly receivable within said tapering barrel. My novel top follower assembly includes a resilient member which may conveniently be placed under variable compression to modify the frictional absorption as desired.

A different object of my invention is a novel form of friction absorbing device wherein a novel form of interlocking arrangement may be afforded between the bottom follower and the friction shoe supported therein as part of the top follower assembly.

My novel arrangement comprehends a friction absorbing device including top and bottom followers, the top follower of which forms support means for a clutch assembly.

Generally speaking, my novel friction absorbing device comprises a bottom follower having a barrel with tapering friction surfaces and a top follower supporting a clutch assembly therein for frictional engagement therewith, and said clutch assembly includes an auxiliary resilient member adjustably supported for varying the compression thereof to modify the frictional absorption of said device.

Referring to the drawings, Figure 1 is a sectional view of one embodiment of my device, said section being taken substantially in the vertical plane bisecting the structure as indicated by line 1—1 of Figure 2.

Figure 2 is a top plan view of the structure shown in Figure 1.

Figure 3 is a sectional view of the device shown in Figure 1 in its compressed position, said section being taken substantially in the same plane as that shown in Figure 1.

Figure 4 is a top plan view of a wedge used in the embodiment shown in Figure 1, and Figure 4A is a side elevation taken from the plane indicated by line A—A of Figure 4.

Figure 5 is a fragmentary sectional view of the device shown in Figure 1, the section being taken substantially in the horizontal plane indicated by line 5—5 of Figure 1.

Figure 6 is a side elevation of a different modification of my device, partly in section, said section being taken substantially in the vertical plane indicated by line 6—6 of Figure 7.

Figure 7 is a top plan view of the modification shown in Figure 6.

Figure 8 is a plan view of the wedge used in the modification shown in Figure 6, and Figure 8A is an edge view thereof.

Figure 9 is a fragmentary sectional view of the modification shown in Figure 6, the section being taken without the spring and substantially in the horizontal plane indicated by line 9—9 of Figure 6.

Figure 10 is a fragmentary sectional view of another modification of my invention, the section being taken substantially in the same vertical plane as that shown in Figure 6.

Describing my novel invention in detail and referring first to the modification shown in Figures 1 to 5 inclusive, the snubbing device generally indicated at 2 (Figure 1) includes a bottom follower 4 having the cylindrical housing 6 received within the coil spring 8 and a base 10 of general circular shape with an annular flange 12 upon which the coil spring 8 may be seated as at 14. The outer surface 16 of said base may be of general arcuate form serving as convenient seating means for said device and may have a centrally formed opening 18 therein affording positioning means for said device on a spring seat (not shown) in well-known manner. The upper inner surfaces 20, 20 of the housing 6 may be tapered inwardly and downwardly to a point 22 conveniently spaced from the top thereof. Adjacent the top of said housing 6, and on the inner surface thereof, may be formed the spaced vertical flanges 24, 24 between the friction surfaces 20, 20 serving to maintain the friction shoes 26, 26 in their proper spaced relationship during operation.

Said shoes are inserted between the vertical flanges 24, 24 and have arcuate friction faces 28, 28 in engagement with the complementary surfaces 20, 20. Diagonally arranged inwardly directed wedge surfaces 30, 30 and 32, 32 may be formed at the top and bottom respectively of said shoes and have sliding abutment against complementary diagonally arranged faces 34, 34 and 36, 36 formed respectively on the bottom of the cup-shaped portion 38 of the top follower 40 and the top of the wedge 42.

The wedge 42 is best seen from a consideration of Figures 4 and 4A and may be of substantially circular shape having its outer circumferential edge interrupted by the spaced slots 44, 44, said slots affording means whereby the wedge 42 may be inserted in the housing 6 to a position below the vertical flanges 24, 24. The wedge may then be rotated until the alternately spaced shallow notches or recesses 46, 46 are in overlapping relationship as at 45 (Figure 1) with the bottom edges 48, 48 of the vertical flanges 24, 24, thus affording interlocking means to maintain said device in assembled relationship.

Said wedge may be seated as at 50 upon a resilient member 52 of generally cylindrical shape, and the resilient member 52 is afforded a seat as at 54 upon a circular washer or disk 56 for compression between said wedge and said disk. Said disk, said resilient member, and said wedge may be supported within the housing 6 by means of a bolt 58 having a head 60 in abutment as at 62 with said disk, said bolt extending through aligned openings in each of them and in the cup-shaped portion 38 of said top follower for threaded engagement with a nut 64 which may be adjusted as desired until said resilient member is under suitable compression and then secured by welding at 66 to prevent loosening thereof.

The top follower 40 has an annular flange 68 serving as upper seating means as at 70 for said spring 8 and has an outer surface 72 of general arcuate shape affording convenient seating means for said device, said surface having a centrally formed opening 74 which provides upper positioning means for said device.

As my novel device is compressed in operation, the friction shoes 26, 26 move inwardly and downwardly in frictional engagement with the tapering inner surfaces 20, 20 of said housing 6 and also in sliding frictional engagement with the diagonally arranged surfaces formed on the top follower 40 and the wedge 42, thus forcing said wedge downwardly and at the same time further compressing the resilient member 52 between said wedge and said disk. It will be apparent that as the shoes are forced downwardly the wedge 42 and the top follower 40 are urged further apart thus further compressing the member 52.

In the modification shown in Figures 6 to 9 inclusive, the bottom follower 80 has a cylindrical portion or housing 82 received within the coil spring 84 and has a base 86 with an annular flange 88 serving as a seat as at 90 for the coil spring 84. The outer surface 92 of said base is of general arcuate shape serving as convenient seating means for the device and may be interrupted centrally thereof by the opening 94 affording positioning means in well-known manner. The inner friction faces 96, 96 of said housing 82 may be tapered inwardly from the top thereof for a convenient distance and have therebetween spaced diametrically opposed vertical flanges 98, 98 formed adjacent the top of the housing 82.

Interposed between the top follower 100 and the wedge 102 may be the friction shoes 104, 104, said shoes having diagonally arranged inwardly directed surfaces 106, 106 and 108, 108 in sliding abutment against complementary surfaces 110, 110 and 112, 112 formed respectively on said top follower and said wedge.

Each shoe has an outer arcuate surface 114 in sliding frictional engagement with the complementary tapered faces 96, 96, said arcuate surface being interrupted by a vertical slot 116 (Figure 9) which cooperates with one of said flanges 98, thus affording guiding means for said shoes within the housing 82. The shoes may be relieved as at 118 to reduce weight.

The form of the wedge 102 is best seen from a consideration of Figures 8 and 8A and may be of general circular shape having the aforesaid friction surfaces 112, 112 and spaced slots 120, 120 formed in its outer circumferential edge to afford means whereby said wedge may be inserted in said housing to a position below the flanges 98, 98. The wedge may then be rotated until the alternately spaced notches or recesses 122, 122 have overlapping relationship as at 124 (Figure 6) with the lower edges of the flanges 98, 98, thus affording means to retain said device in assembled relationship.

The wedge 102 may be seated as at 126 upon the cylindrical resilient member 128 which is seated as at 130 on the disk or washer 132 and may be compressed therebetween. Said wedge, said resilient member, and said disk may be supported within said housing by means of a bolt 134 having its head 136 in abutment against said disk as at 138 and passing through aligned openings in said wedge, said resilient member, said disk, and the cup-shaped portion 140 of said top follower 100 for threaded engagement with a nut 142. The resilient member may be placed under compression by tightening said nut 142 which may then be welded as at 144 to prevent loosening thereof. The top follower affords a seat for the coil spring 84 as at 146 and has an outer surface of general arcuate shape affording convenient upper seating means for said device, said outer surface being interrupted centrally thereof by the opening 148 which provides upper positioning means for said device.

As the device is placed under load, the shoes move downwardly and inwardly with their friction faces in frictional engagement with complementary surfaces on said top follower, said wedge, and said housing, thus urging apart the wedge and top follower and further compressing the resilient member 128 between said wedge and said disk. As the load is released, said device is returned to its normal position by expansion of the coil spring 84.

The fragmentary structure shown in Figure 10, which discloses another modification of my invention, is substantially similar to the corresponding structure shown in the foregoing modifications and may be adapted thereto. This modification differs from the foregoing modifications in that a radially inwardly projecting annular shelf or flange 160 is integrally formed around the inner surfaces of the bottom follower 162 and adjacent the bottom thereof. Said shelf 160 may be conveniently located so that it will have abutment as at 164 against the circular washer 166 just before the device is completely closed. The abutment of said shelf with the washer 166 further compresses the resilient member 168 and thus increases the frictional absorption of said device to a maximum.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a friction absorbing device, end followers, a compression spring seated therebetween, one of said followers having a friction barrel extending within said spring and presenting internal tapering faces, friction means associated with the other of said followers and projecting within said friction barrel, said means comprising wedge faces on said last-mentioned follower, a wedge member spaced therefrom, a resilient member supported from said last-mentioned follower and affording a seat for said wedge member, a plurality of shoes extending between said top follower and said wedge member and frictionally engaging said wedge member, said wedge faces, and said tapering faces, and means on said bottom follower cooperating with slots on said shoes to retain said shoes in spaced relationship.

2. In a friction absorbing device, end followers, a compression spring seated therebetween, one of said followers having a friction barrel extending within said spring and presenting internal tapering faces, friction means associated with the other of said followers and projecting within said friction barrel, said means comprising wedge faces on said last-mentioned follower, a wedge member spaced therefrom, a resilient member supported from said last-mentioned follower and affording a seat for said wedge member, a plurality of shoes extending between said top follower and said wedge member and frictionally engaging said wedge member, said wedge faces, and said tapering faces, and internal flanges on said bottom follower cooperating with said wedge member to retain said device in assembled relationship.

3. In a friction absorbing device, end followers, a compression spring seated therebetween, one of said followers having a friction barrel extending within said spring and presenting internal tapering faces, friction means associated with the other of said followers and projecting within said friction barrel, said means comprising wedge faces on said last-mentioned follower, a wedge member spaced therefrom, an adjustably compressible resilient member supported from said last-mentioned follower and affording a seat for said wedge member, a plurality of shoes extending between said top follower and said wedge member and frictionally engaging said wedge member, said wedge faces, and said tapering faces, and means on said bottom follower for further compressing said resilient member as said device approaches maximum compression.

4. In a friction absorbing device, a coil spring, top and bottom followers affording seats for said spring, said bottom follower having a friction barrel extending within said spring and presenting internal tapering friction surfaces, said top follower supporting clutch means within said friction barrel, said clutch means comprising top and bottom wedge means, a plurality of friction shoes extending between said wedge means with friction faces in complementary engagement with said tapering surfaces, and lugs on said barrel having sliding engagement with slots on said shoes to prevent relative rotation thereof, said lugs having overlapping relationship with one of said wedge means to prevent accidental dismantling.

5. In a friction absorbing device, a coil spring, top and bottom followers affording seats for said spring, said bottom follower having a friction barrel extending within said spring and presenting internally tapering friction surfaces, said top follower having a wedge member extending within said spring and affording support for a clutch mechanism, said clutch mechanism including a spring cap, wedge means, a resilient member between said spring cap and wedge means, a plurality of shoes having wedge face engagement with said wedge member and said wedge means and having complementary friction faces in engagement with said tapering surfaces, and means on said bottom follower for abutment with said spring cap to develop maximum friction absorption near the end of movement.

6. In a friction absorbing device, a coil spring, a bottom follower having extending within said spring a cylindrical portion with tapering friction surfaces, a top follower, a clutch assembly supported from said top follower and extending within said cylindrical portion and comprising wedge surfaces on said top follower, a wedge member spaced from said top follower, a series of shoes having wedge engagement with said top follower and said wedge member and having frictional engagement with said surfaces, a resilient member in abutment with said wedge member, and stop means on said bottom follower engaging said clutch assembly as said device is closed for increasing the frictional absorption to a maximum.

7. In a friction absorbing device, end followers, a compression spring seated therebetween, one of said followers having a friction barrel extending within said spring and presenting internal tapering faces, friction means associated with the other of said followers and projecting within said friction barrel, said means comprising wedge faces on said last-mentioned follower, a wedge member spaced therefrom, a resilient member supported from said last-mentioned follower and affording a seat for said wedge member, a plurality of shoes extending between said wedge faces and said wedge member and frictionally engaging said wedge member, said wedge faces, and said tapering faces, and flanges between said tapering faces affording guide means for said shoes and having abutment with said wedge member to retain said device in assembly.

8. In a friction absorbing device, a compression spring, top and bottom followers affording seats therefor, said bottom follower having a cylindrical housing projecting within said spring and presenting internal tapering faces, said top follower having a wedge portion extending within said housing and supporting a clutch assembly therewithin, said clutch assembly comprising a resilient member spaced from said wedge portion, a wedge member seated on said resilient member, a plurality of friction shoes in wedge engagement with said wedge member, said wedge portion and said tapering faces, and means on said bottom follower for engagement with said wedge member to retain said device in assembled relationship.

9. In a friction absorbing device, a coil spring, top and bottom followers affording seats for said spring, said bottom follower having a friction barrel extending within said spring and presenting internal tapering friction surfaces, said top follower supporting clutch means within said friction barrel, said clutch means comprising top and bottom wedge means, a plurality of friction shoes extending between said wedge means with friction faces in complementary engagement with said tapering surfaces, and lugs on said barrel having sliding engagement with slots on said shoes to prevent relative rotation thereof.

10. In a friction absorbing device, a coil spring, top and bottom followers affording seats for said spring, said bottom follower having a friction barrel extending within said spring and presenting internal tapering friction surfaces, said top follower supporting clutch means within said friction barrel, said clutch means comprising top and bottom wedge means, a plurality of friction shoes extending between said wedge means with friction faces in complementary engagement with said tapering surfaces, and internal lugs on said barrel slidable within means on said shoes affording guide means therefor.

11. In a friction absorbing device, inner and outer resilient means, end followers affording seats for said outer resilient means and having wedge means received therebetween, said inner resilient means being supported and spaced from one of said end followers within the other of said followers, a wedge member seated on said inner resilient means, a plurality of shoes having complementary engaging frictional surfaces with said wedge means on said followers and said wedge member, and interengaging means on one of said followers and said member retaining said device in assembly.

12. In a friction absorbing device, a coil spring, a bottom follower having a barrel portion extending therewithin and presenting internal tapering friction surfaces, a top follower with means supporting a clutch mechanism within said barrel portion, said clutch mechanism comprising top and bottom wedge means, a plurality of shoes extending therebetween and having friction faces in complementary engagement with said tapering surfaces, and means on said bottom follower cooperating with said bottom wedge means to retain said device in assembly.

13. In a friction absorbing device, inner and outer resilient means, end followers affording seats for said outer resilient means and having wedge means received therein, said inner resilient means being supported and spaced from one of said end followers within the other of said followers, a wedge member seated on said inner resilient means, a plurality of shoes having complementary engaging friction surfaces with said wedge means on said followers and said wedge member, and means on said shoes accommodating therewithin means on one of said followers for preventing relative rotation therebetween.

14. In a friction absorbing device, inner and outer resilient means, end followers affording seats for said outer resilient means and having wedge means received therein, said inner resilient means being supported and spaced from one of said end followers within the other of said followers, a wedge member seated on said inner resilient means, a plurality of shoes having complementary engaging friction surfaces with said wedge means on said followers and said wedge member, and means on one of said followers cooperating with said inner resilient means to increase frictional absorption to a maximum.

15. In a friction absorbing device, a coil spring, a bottom follower having a barrel portion extending therewithin and presenting internal tapering friction surfaces, a top follower with means supporting a clutch mechanism within said barrel portion, said clutch mechanism comprising top and bottom wedge means, a plurality of shoes extending therebetween and having friction faces in complementary engagement with said tapering surfaces, and means on said bottom follower engaging said clutch mechanism as said device is closed for increasing frictional absorption to a maximum.

16. In a friction device, a coil spring, end followers having wedge means extending within said spring, a resilient member supported from one of said followers within the other of said followers, and wedge elements between said resilient member and its supporting follower, certain of said wedge elements cooperating with said wedge means to frictionally resist closure of said device, and means on one of said followers engaging one of said elements to retain said device in assembly.

17. In a friction device, a coil spring, end followers having wedge means extending within said spring, a resilient member supported from one of said followers within the other of said followers, and wedge elements between said resilient member and its supporting follower, certain of said wedge elements cooperating with said wedge means to frictionally resist closure of said device, and means on one of said followers slidable within means on certain of said elements to prevent relative rotation therebetween.

18. In a friction device, a coil spring, end followers having wedge means extending within said spring, a resilient member supported from one of said followers within the other of said followers, and wedge elements between said resilient member and its supporting follower, certain of said wedge elements cooperating with said wedge means to frictionally resist closure of said device, and means on one of said followers increasing the frictional resistance to a maximum as said device is closed.

ROBERT B. COTTRELL.